(12) United States Patent
Ullrich et al.

(10) Patent No.: US 8,100,682 B2
(45) Date of Patent: Jan. 24, 2012

(54) SYSTEM FOR INJECTION MOLDING

(75) Inventors: Waldemar Ullrich, Bochum (DE); Markus Thrien, Bochum (DE)

(73) Assignee: Research In Motion Limited, Waterloo, Ontario (CA)

( * ) Notice: Subject to any disclaimer, the term of this patent is extended or adjusted under 35 U.S.C. 154(b) by 8 days.

(21) Appl. No.: 12/556,927

(22) Filed: Sep. 10, 2009

(65) Prior Publication Data
US 2011/0059286 A1    Mar. 10, 2011

(51) Int. Cl.
B29C 45/14    (2006.01)
(52) U.S. Cl. .......... 425/122; 425/123; 425/129.1
(58) Field of Classification Search .......... 425/122, 425/123, 124, 127, 129.1
See application file for complete search history.

(56) References Cited

U.S. PATENT DOCUMENTS

| | | | |
|---|---|---|---|
| 4,752,059 A | | 6/1988 | Oishi et al. |
| 4,793,784 A | * | 12/1988 | Belleville et al. ............ 425/111 |
| 5,045,971 A | * | 9/1991 | Ono et al. ............ 361/704 |
| 5,650,115 A | * | 7/1997 | Proos et al. ............ 264/400 |
| 5,872,699 A | | 2/1999 | Nishi et al. |
| 6,475,423 B1 | * | 11/2002 | Masterson et al. ............ 264/511 |
| 6,630,374 B2 | * | 10/2003 | Yamamoto ............ 438/124 |
| 6,752,946 B2 | * | 6/2004 | Toyooka ............ 264/266 |
| 2009/0005132 A1 | * | 1/2009 | Ogatsu ............ 455/575.3 |

FOREIGN PATENT DOCUMENTS

| | | |
|---|---|---|
| EP | 0393236 A1 | 10/1990 |
| EP | 1857268 A1 | 11/2007 |
| EP | 1897669 A1 | 3/2008 |
| EP | 1918800 A1 | 5/2008 |

OTHER PUBLICATIONS

Boecklein M et al: "Dekorieren Von Spritzgussteilen Im Werkzeug" Kunststoffe, Carl Hanser Verlag, Munchen, DE, vol. 76, No. 1, Jan. 1, 1986, pp. 1028-1032, ISSN: 0023-5563.
EP09169967.8—Search Report(Mar. 9, 2010).

* cited by examiner

*Primary Examiner* — Jill Heitbrink
(74) *Attorney, Agent, or Firm* — Novak Druce + Quigg LLP

(57) ABSTRACT

A method of and system for injection molding is shown. The method can include the positioning one or more metal components in a mold, aligning a film for transferring an image from the film onto a surface of a plastic component, injecting a material into the mold to form the plastic component such that the metal component will be embedded in the plastic component and transferring the image from the film onto the surface of the plastic component that has the embedded metal component. The method can also include the removing the transferred image from the metal component if at least a portion of the transferred image adheres to the metal component.

19 Claims, 5 Drawing Sheets

SYSTEM FOR INJECTION MOLDING

FIELD OF TECHNOLOGY

The subject matter herein generally relates to injection molding and in particular, to injection molding of articles containing metal components.

BACKGROUND

Injection molding is a manufacturing process in which a material is fed into a heated barrel, mixed and then forced into a mold cavity. The material cools and then hardens into the configuration of the mold cavity, thereby generating a desired product. This process has been used to manufacture handset housings for many years. To keep up with trends in the industry, many mobile device manufacturers have used materials in the injection molding process that will produce housings of various colors. In addition to the creation of colored housings, this practice is relatively simple to implement and does not lead to a significant increase in manufacturing costs.

However, many designers and consumers believe that these housings have little luster and are essentially flat when compared to those made of metal. In an effort to make the housing surface more polished-looking, manufacturers have resorted to painting the housing following the injection molding process. To do so, however, any metal surfaces that may be part of the housing must be masked to prevent the paint from being applied to them. This masking procedure slows down and adds expense to the manufacturing process.

BRIEF DESCRIPTION OF THE DRAWINGS

Embodiments of the present application will now be described, by way of example only, with reference to the attached Figures, wherein.

DETAILED DESCRIPTION

Figure 1:
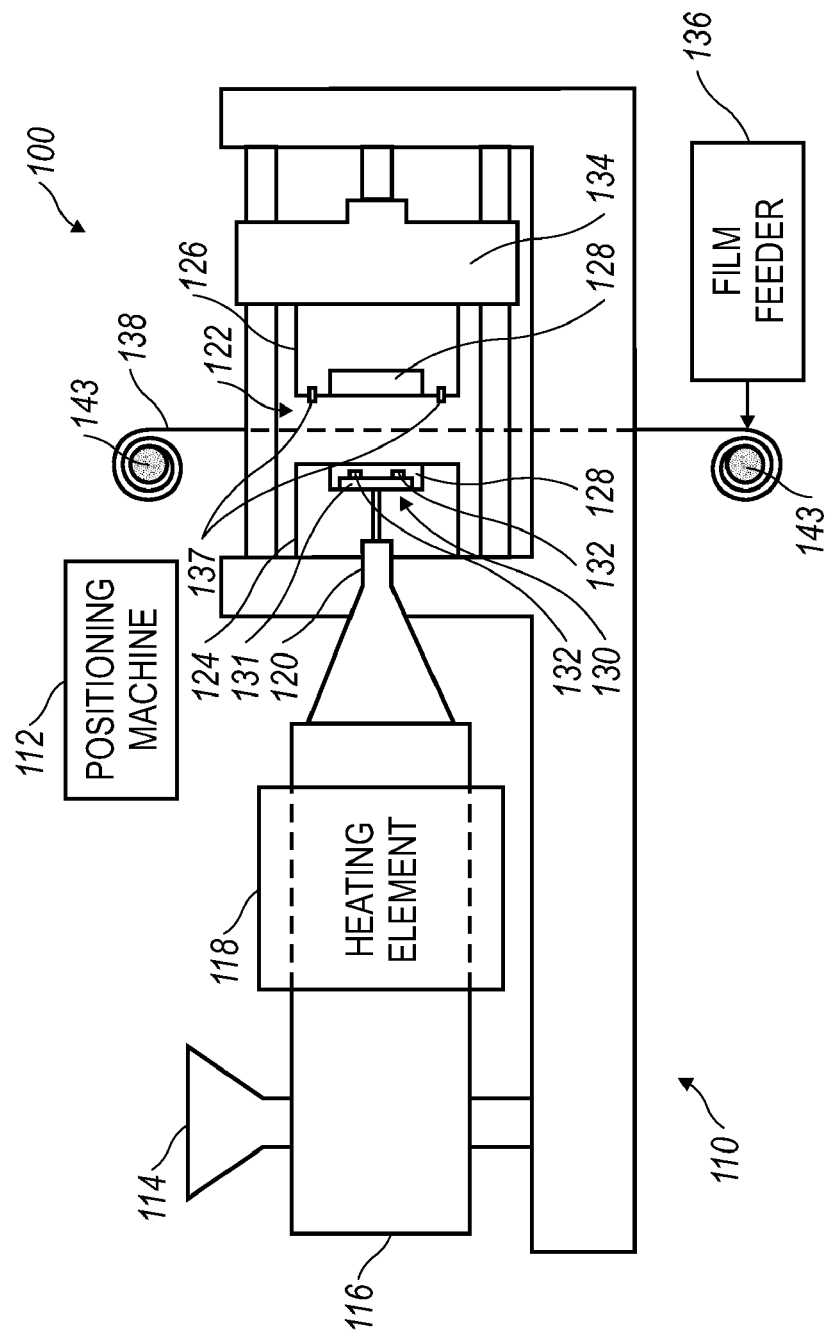
FIG. 1 illustrates an example of a system for injection molding.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein.

Several definitions that apply throughout this document will now be presented. The terms "metal" or "metal component" are defined as any element or alloy that readily becomes a cation and forms ionic bonds, having relatively free valence electrons and that is able to conduct electricity. A "mold" is defined as a component that contains one or more cavities or channels for accepting and giving a particular shape to something in a molten state. The term "image" is defined as a physical likeness or representation of a person, animal or thing that is capable of being displayed on a plastic surface. The terms "plastic" or "plastic component" mean any substance made of one or more polymers that is capable of being shaped or molded when subjected to heat and pressure. A "nozzle" is defined as a component that has an opening and that directs the flow of a fluid. The term "housing" is defined as any structure that is designed to cover or protect any component. The phrases "embedded in," "embedded within" and "integrated with" are defined as a state in which one element is at least partially surrounded by another element with at least one surface of the partially surrounded element exposed.

As noted earlier, it is desirable to improve the appearance of, for example, mobile devices that are constructed of plastic components that are externally exposed to a user. One method of doing so is to increase the sheen or shine associated with such plastic surfaces. To do so, these surfaces may be painted; however, this process is inefficient because any exposed metal components must be masked prior to the paint being applied. The method presented herein overcomes at least one of these disadvantages.

The method can include positioning one or more metal components in a mold and aligning a film for transferring an image from the film onto a surface of a plastic component. The method can also include injecting a material into the mold to form the plastic component such that the metal component will be embedded in the plastic component and transferring the image from the film onto the surface of the plastic component that has the embedded metal component. The heat from the material that forms the plastic component can cause the image from the film to be transferred to the plastic component, but it has been discovered unexpectedly and advantageously that the film does not adhere to the metal component. Even if a portion of the transferred image remains on the metal component, such artwork is easily removed from the metal component. This process enables various images to be integrated with external surfaces of a housing or other device with no interference in the overall efficiency of the injection molding of the housing or device. Moreover, the embedded metal components can maintain their shine because they are not affected by the transmission of the image from the film.

Referring to FIG. 1, an example of a system 100 for injection molding is shown. In one arrangement, the system 100 can include an injection molding unit 110 and a positioning machine 112 that can work in combination to form devices containing both plastic and metal components. In one arrangement, the injection molding unit 110 can include a hopper 114 coupled to a barrel 116 in which the hopper 114 can receive pellets or granules. The barrel 116 can include a mixing element (not shown), such as a reciprocating screw (not shown), and a heating element 118, which can heat the granules into a molten material prior to the material entering a nozzle 120. The nozzle 120 can be coupled to the barrel 116 and can direct the molten material into a mold 122.

As an example, the mold 122 can include a first mold block 124 and a second mold block 126, and one or both of the first mold block 124 and the second mold block 126 can contain a mold cavity 128 for receiving the molten material from the nozzle 120. A "mold cavity" is defined as any hollow space capable of receiving molten material and directing the molten material or shaping the molten material during an injection molding process. The positioning machine 112 can be used to position one or more, for example, metal components in the mold 122. The term "positioning machine" is defined as any component or group of components configured to place at least metal components in a mold for an injection molding process.

In one arrangement, the first mold block 124 can include an ejection mechanism 130 for removing a molded component from the mold 122 once the molded component has been cured. As an example, the ejection mechanism 130 can include one or more ejector pins 132 for ejecting the molded component from the first mold block 124, although any other suitable component can be employed for such a function.

The injection molding unit 110 can also include a pressing mechanism 134 that is operable to bring the first mold block 124 and the second mold block 126 into sealed contact with one another prior to the material being injected into the mold 122. Once the molded component has been cured, the pressing mechanism 134 can separate the first mold block 124 and the second mold block 126, thereby enabling the molded component to be ejected from, for example, the first mold block 124.

The system 100 can also include a film feeder 136 that is configured to feed a film 138 through the mold 122. The term "film feeder" is defined as a component or group of components that is configured to force, pass, push or direct film in or through a mold. The film feeder 136 can include one or more spools 143 around which the film 138 can be wrapped. One or more supports 137 can be considered part of the film feeder 136 and can be placed on, for example, the second mold block 126 to assist in the positioning of the film 138. The film feeder 136 can control the movement of the film 138 through the mold 122 based on the operation of the injection molding unit 110. For example, the film feeder 136 can feed the film 138 through the mold 122 by passing the film 138 between the first mold block 124 and the second mold block 126 when the first mold block 124 and the second mold block 126 are separated from one another. The term "separated from one another" means that there is at least a gap between the mold blocks 124, 126 that would allow the film 138 to pass between the mold blocks 124, 126 without interfering with the injection molding process.

Figure 2:
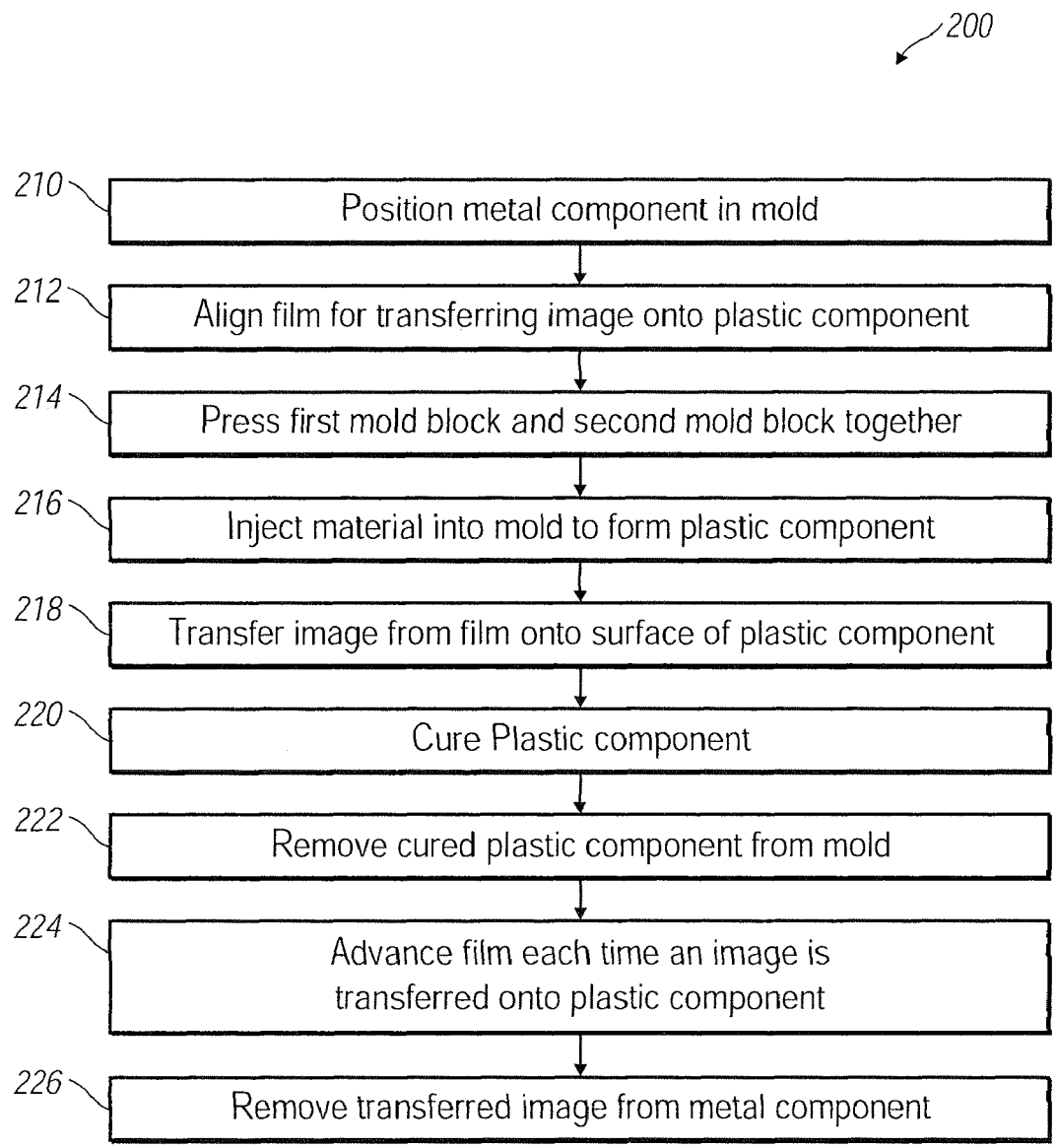
FIG. 2 illustrates an example of a method of injection molding.

Referring to FIG. 2, an example of a method 200 of injection molding is shown. When describing this method 200, reference can be made to the system 100 of FIG. 1, although it is understood that the method 200 can be practiced with any other suitable system. Moreover, it must be noted that the method 200 is not necessarily limited to the method as illustrated, as the method 200 can contain a greater or fewer number of steps in comparison to what is pictured. The method 200 is not necessarily limited to the particular ordering shown here, either.

At block 210, one or more metal components can be positioned in a mold, and a film can be aligned for transferring an image from the film onto a surface of a plastic component, as shown at block 212. At block 214, a first mold block and a second mold block can be pressed together, such as prior to a material being injected into the mold. At block 216 the material can be injected into the mold to form the plastic component such that the metal component will be embedded in the plastic component. The image can be transferred from the film onto the surface of the plastic component, as shown at block 218. The plastic component can be cured and removed from the mold, as shown respectively in blocks 220 and 222. At block 224, the film can be advanced, such as each time an image is transferred onto a surface of a plastic component. As an option, if any portion of the image adheres to the metal component, the transferred image can be removed from the metal component, as recited in block 226. Further examples of these will be described below.

Figure 4:
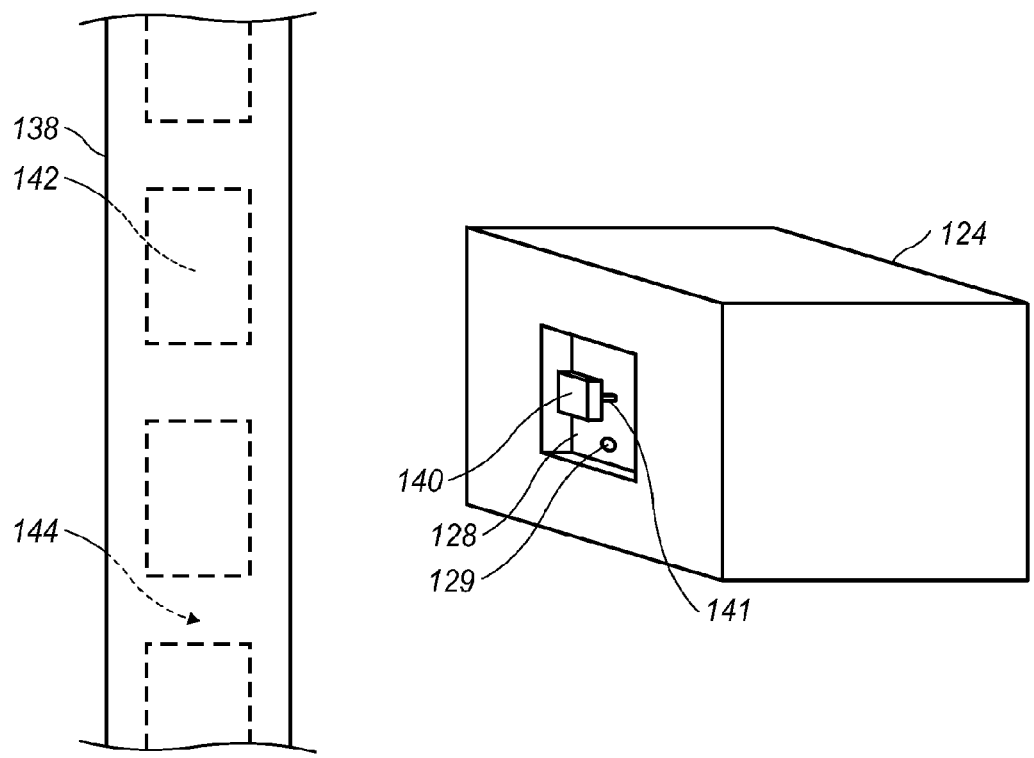
FIG. 4 illustrates an exemplary arrangement of another mold block and a portion of a film.

Using the method and system as presented herein, the metal components can be implemented or integrated with a plastic housing. To do so, referring to FIG. 1, the positioning machine 112 can automatically position one or more such components in the mold 122. These metal components can be held in place in the mold 122 by any suitable attachment or supporting structures. In one example, the metal components can contain one or more holes or indentations for receiving support projections (for example, support projection 141, as shown in FIG. 4), and the positioning machine 112 can place the metal components on the support projections in the first mold block 124, such as in the mold cavity 128 of the first mold block 124. This structure can keep the metal components in place when the material is injected into the mold cavity 128.

Figure 3:
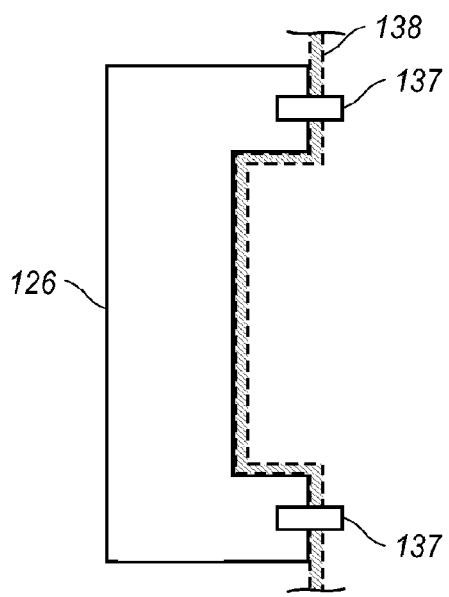
FIG. 3 illustrates an exemplary arrangement of a mold block and a portion of a film.

Following the placement of the metal component, the film feeder 136 can align the film 138 to permit an image on the film to be transferred from the film 138 onto a surface of a plastic component. The phrase "aligning a film" means any method or process carried out such that a film containing an image is positioned to ensure that the image is to be correctly placed on a component. As an example, this alignment can include the film feeder 136 positioning the film 138 between the first mold block 124 and the second mold block 126. As another example, the image from the film 138 can be on the side of the film 138 that faces the positioned metal component, in this case, the first mold block 124. It is understood, however, that the film 138 is not so limited as the images can be on the side facing the second mold block 126, if desired, or images can be contained on both sides of the film 138. To assist in the alignment, at least a partial vacuum can be created in the second mold block 126, which can draw the film 138 against the interior of the second mold block 126. An example of this is shown in FIG. 3.

Referring to FIG. 4, an exemplary arrangement of the first mold block 124 and a portion of the film 138 are shown. To avoid viewing obstructions, the ejector pins 132 are omitted in this drawing. Here, a metal component 140 has been placed in the mold cavity 128 by the positioning machine 112. In this example, the metal component 140 has been situated on a support projection 141 of the first mold block 124. One or more images 142 can be placed on a side 144 of the film 138 that faces the metal component 140. The dashed outlines for the images 142 indicate that the images 142 are positioned on the side 144 of the film 138 that is opposite to the side of the film 138 facing out away from the page. As will be explained below, molten material can be injected into the mold cavity 128 through a gate 129, and an image 142 can be transferred to a plastic component that forms from the curing of the molten material.

The film 138 can be constructed of any suitable material that enables images contained on the film to be transferred to other surfaces. For example, the film 138 can be a plastic-based material that is pre-printed with decorative images. In fact, the term "film" is defined as any substrate containing one or more images that permits transfer of such images from the substrate onto a component during an injection molding process. Although the description here suggests that the film 138 can be aligned following the placement of the metal component 140, the positioning of the film 138 can occur prior to the setting of the metal component 140. In other embodiments, the plastic-based material can be pre-printed to have a desired texture, reflectivity, color, or any combination thereof.

The pressing mechanism 134 can cause the first mold block 124 and the second mold block 126 to be pressed together to form, for example, a sealed contact. Subsequently, the nozzle 120 can direct the molten material into the mold 122 to form a plastic component. As an example, the molten material can be a thermoplastic or thermosetting plastic material. The molten material can enter the mold cavity 128 and can at least partially surround the positioned metal component 140. As the molten material cures to form the plastic component, the metal component 140 can become embedded in or integrated with the plastic component.

Figure 5:
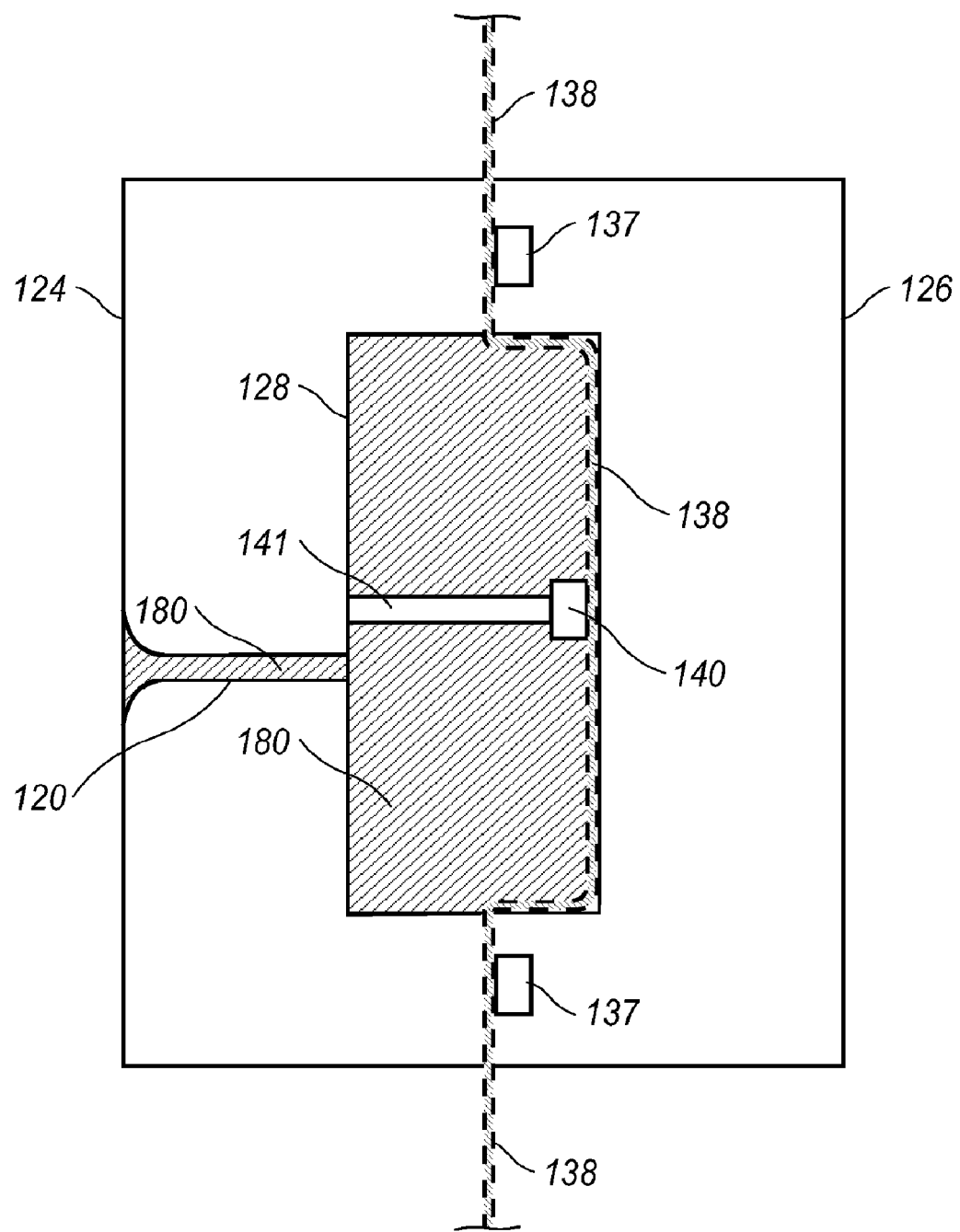
FIG. 5 illustrates an exemplary arrangement of two mold blocks pressed together.

Referring to FIG. 5, an example of a side profile of the first block 124 and the second block 126 pressed together is shown. Molten material 180, which is represented by the diagonal lines, is ejected into the mold cavity 128 by the nozzle 120 and can conform to the shape of the cavity 128. As described previously, the molten material 180 can surround the metal component 140 (positioned on the support projection 141). Moreover, a portion of the molten material 180 can be forced up against the film 138.

The heat from the molten material 180 can cause the image 142 (see FIG. 4) on the film 138 to be transferred from the film 138 onto a surface of the plastic component formed from the injection molding. As the plastic component formed from the molten material 180 cures, the image 142 can become a permanent part of the plastic component. This procedure can permit, for example, handset manufacturers to incorporate various designs into their products. Once the plastic component is cured, the pressing mechanism 134 can separate the first mold block 124 and the second mold block 126. By curing, it is meant that the plastic component has reached a state in which it can be removed from the mold 122 without damaging the plastic component. In one arrangement, the mold 122 can be designed to have the cured plastic component adhere to the first mold block 124. As such, the ejection mechanism 130 (see FIG. 1) can remove or eject the plastic component from the first mold block 124. For example, the ejection mechanism 130 can include one or more ejector pins 132 or some other suitable structure for ejecting the plastic component. Once the plastic component has been removed from the mold 122, the film 138 can be advanced to the next image, and the molding procedure described above can be repeated. As an example, the film 138 can be advanced each time an image 142 is transferred onto a surface of a plastic component.

Figure 6:
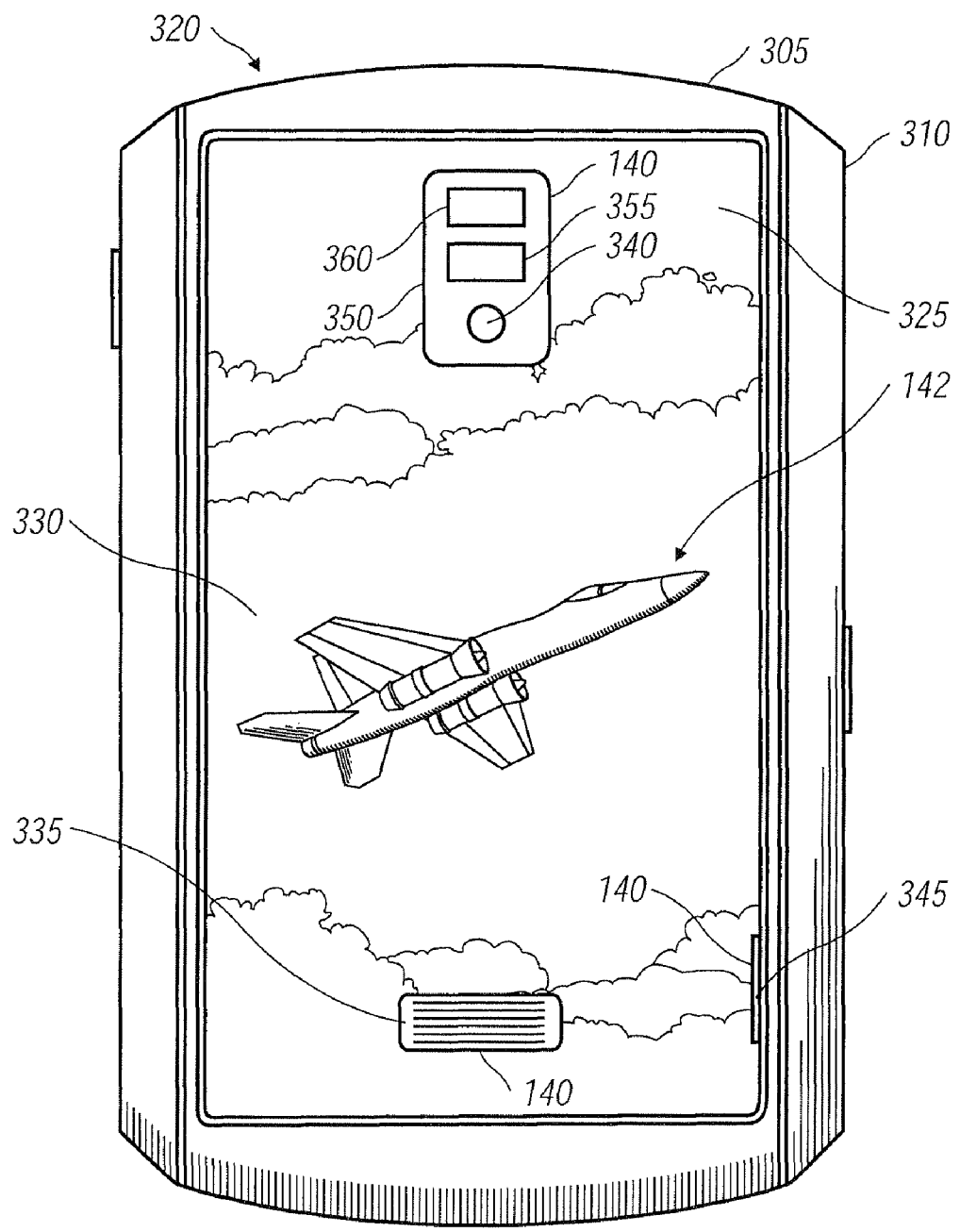
FIG. 6 illustrates an example of a device at least partially formed from an injection molding process.

The method described above can permit various designs to be incorporated into plastic components. As previously noted, it has been discovered that the film 138 does not adhere or loosely adheres to the metal components 142 that are embedded in or integrated with the plastic component. As such, unique designs can be imparted on a plastic surface without having to mask any metal components 140 that may be integrated with the plastic component. Referring to FIG. 6, an example of a device that can be formed from the process described above is shown. In this example, a plastic component 305 formed from the injection molding described above can be a housing 310 of a mobile device 320, although it is understood that various other articles can be formed. The housing 310 can be or can include a battery cover 325 that has a plastic surface 330 in which several metal components 140 can be embedded within the plastic surface 330. For example, a mesh 335, a logo 340, a charger interface 345 or a camera interface 350 can be embedded in or integrated with the plastic surface 330 of the battery cover 325.

In one arrangement, the mesh 335 can be designed to cover an audio port, such as a speaker, and the logo 340 can be any symbol for identifying a party, such as the handset manufacturer. The charger interface 345 can be any suitable device for receiving an external charger, and the camera interface 350 can provide protection for a camera lens 355 and a flash 360. It must be stressed that these are merely examples of metal components, as other suitable structures can be incorporated into the device formed from the injection molding.

In this example, an image 142 of an airplane surrounded by several clouds has been transferred and adhered to the plastic surface 330 of the battery cover 325. As explained earlier, this image 142 will not substantially adhere to the metal components 140 when the image 142 is transferred onto the plastic surface 330. As such, the image 142 can at least partially surround the metal components 140. For example, the clouds of this image 142 can surround the logo 340, the charger interface 345 and the mesh 335. Moreover, because the image 142 does not adhere to the metal components 140, no abrasive technique is required for removing the image 142 from the metal components 140. Thus, the metal components 140 can maintain their initial shine or luster after the injection molding process.

Although the image 142 generally will not adhere to the metal components 140, there is a possibility that portions of the image 142 can stick to such components 140. This adhesion is not secure, however, and the image 142 that remains attached to a metal component 140 can be easily removed. For example, the image 142 could be simply rubbed off the metal component 140, brushed off with a non-abrasive brush or blown or washed off with a stream of air or liquid.

Portions of the system 100 for injection molding and supporting components can take the form of hardware elements, software elements or elements containing both hardware and software. In one embodiment, the software portions can include, but are not limited to, firmware, resident software, microcode, etc. Furthermore, these software portions can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the system can be centralized or distributed (or a combination thereof) as known to those skilled in the art.

A data processing system suitable for storing program code and for executing program code, which can be implemented in any of the above-referenced devices described herein, can include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. I/O devices (including but not limited to keyboards, displays, pointing devices, etc.) can be coupled to the system either directly or through intervening I/O controllers.

Examples have been described above regarding a method and system of injection molding and a device that can be manufactured therefrom. One of ordinary skill in the art, however, will appreciate that the method can be implemented in other suitable systems and can be used to produce other devices containing plastic components. In addition, various modifications to and departures from the disclosed embodiments will occur to those having skill in the art. The subject matter that is intended to be within the spirit of this disclosure is set forth in the following claims.

What is claimed is:

1. A system for injection molding, comprising:
a mold that includes a first mold block and a second mold block;
a support structure provided in the first mold block to fixedly secure a metal component;
a positioning machine that affixes the metal component onto the support structure;
a nozzle that is configured to inject a material into the mold to form a plastic component having a plastic surface such that the metal component is integrated with the plastic surface; and
a film feeder that is configured to feed film through the mold, wherein the film contains one or more images that adhere to the plastic surface formed from the material injected into the mold and wherein the one or more images extend over the metal component integrated with the plastic surface.

2. The system according to claim 1, wherein the mold has an ejection mechanism that is configured to remove the plastic component from the mold once the plastic component has been cured.

3. The system according to claim 1, wherein one of or both of the first mold block and the second mold block has a mold cavity for receiving the material from the nozzle.

4. The system according to claim 3, wherein the film feeder includes one or more spools to which the film is attached, and the film feeder is further configured to feed the film through the mold by passing the film between the first mold block and the second mold block when the first mold block and the second mold block are separated from one another.

5. The system according to claim 1, wherein the metal component is a mesh designed to cover an audio port, a logo, a charger interface or a camera interface.

6. The system according to claim 1, wherein the material injected into the mold is a thermoplastic or thermosetting plastic material.

7. The system according to claim 3, further comprising a pressing mechanism that is operable to bring the first mold block and the second mold block into sealed contact with one another prior to the material being injected into the mold and to subsequently separate the first mold block and the second mold block.

8. The system according to claim 1, further comprising a heating element that is configured to heat the material prior to entering the nozzle.

9. The system according to claim 1, wherein the film feeder is configured to advance the film each time an image is transferred onto the plastic surface.

10. The system according to claim 1, wherein the film feeder is configured to push film through the mold.

11. The system according to claim 1, wherein the film feeder comprises supports and spools.

12. The system according to claim 3, wherein a partial vacuum is created in the second mold block.

13. The system according to claim 1, wherein the film feeder is capable of feeding film having a texture.

14. The system according to claim 1, wherein the film has a pre-printed texture.

15. The system according to claim 1, further comprising an ejector mechanism including ejector pins.

16. The system according to claim 4, further comprising a pressing mechanism that is operable to bring the first mold block and the second mold block into sealed contact with one another prior to the material being injected into the mold and to subsequently separate the first mold block and the second mold block.

17. The system according to claim 16, further comprising a heating element that is configured to heat the material prior to entering the nozzle.

18. The system according to claim 17, wherein a partial vacuum is created in the second mold block.

19. The system according to claim 1, further comprising an image remover configured to remove a portion of the transferred image that adheres to the metal component.

* * * * *